(12) United States Patent
Newman

(10) Patent No.: US 8,816,522 B2
(45) Date of Patent: Aug. 26, 2014

(54) HIGH SPEED MAGNUS ROTOR

(76) Inventor: Edwin Newman, Palmdale, CA (US)

( * ) Notice: Subject to any disclaimer, the term of this patent is extended or adjusted under 35 U.S.C. 154(b) by 140 days.

(21) Appl. No.: 13/462,508

(22) Filed: May 2, 2012

(65) Prior Publication Data

US 2013/0292947 A1    Nov. 7, 2013

(51) Int. Cl.
*F03D 9/00* (2006.01)
*H02P 9/04* (2006.01)

(52) U.S. Cl.
USPC .......................................................... 290/55

(58) Field of Classification Search
CPC ........... F03D 5/00; F03D 9/00; Y02E 10/725; Y02E 10/70; Y02E 10/721; F04D 29/04
USPC ........................... 290/55, 44, 43, 54; 416/174
See application file for complete search history.

(56) References Cited

U.S. PATENT DOCUMENTS 4,582,013 A * 4/1986 Holland, Jr. .................. 114/39.3

* cited by examiner

*Primary Examiner* — Javaid Nasri

(57) ABSTRACT

A magnus rotor designed for high speed operation. Aerodynamic drag is reduced by lessening the air density around endplates and half the radial surface of the rotor by installing a circuit of aerodynamic seals to enclose a vacuum about the internal volume of the rotor as well as the endplates and half the radial surface of the rotor.

1 Claim, 1 Drawing Sheet

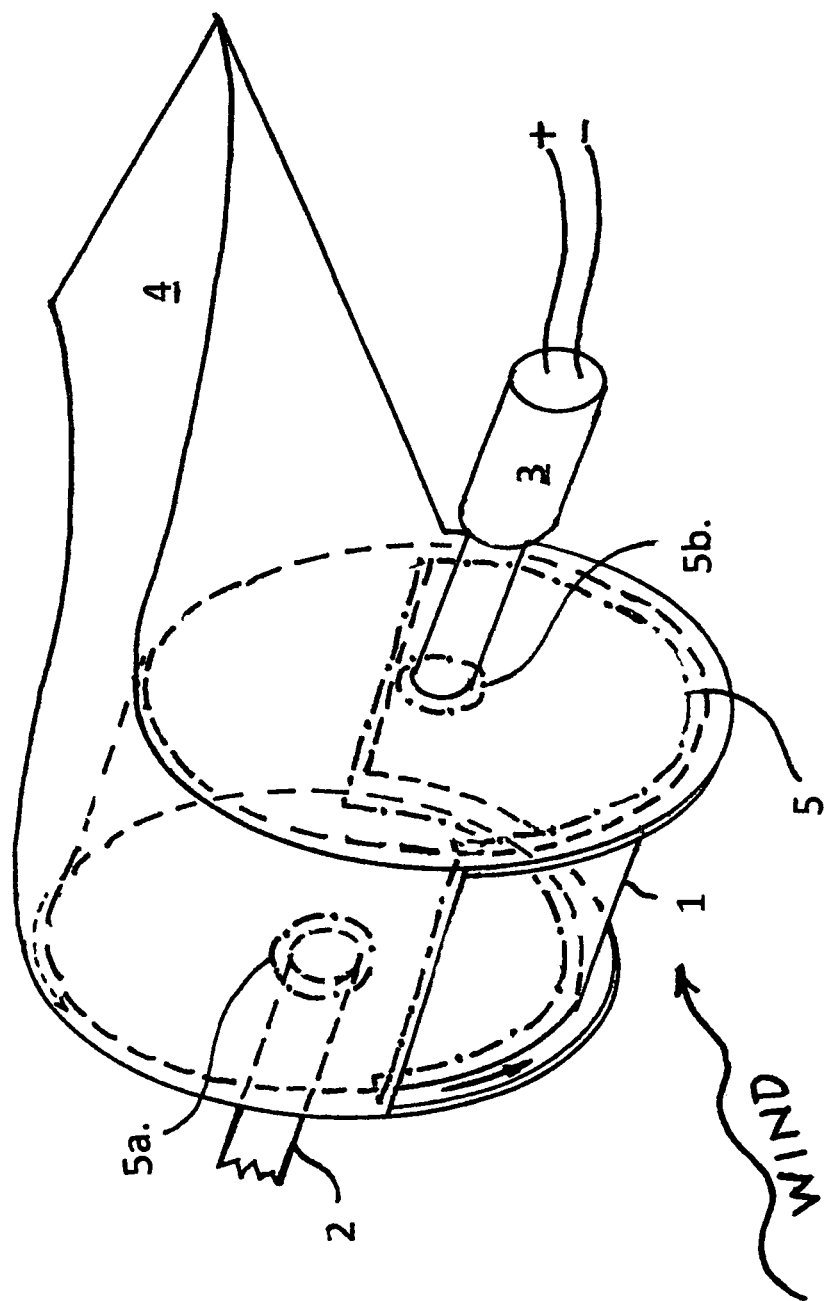

HIGH SPEED MAGNUS ROTOR

BACKGROUND OF THE INVENTION

1. Field of the Invention

This invention relates to magnus rotors and more specifically to the use of magnus rotors as part of a system for generating electricity from wind energy.

2. Description of the Prior Art

It is generally accepted that a magnus rotor can only be revolved at about four times the wind speed for the purpose of converting wind energy into electrical energy. Experiments have shown this to be correct with the present technology. This is because as the magnus rotor is made to spin faster and faster the aerodynamic drag is built up rather rapidly to the point where it takes more energy to revolve the rotor than the energy output of the system. Referring to U.S. Pat. No. 4,582,013 and the research upon which it is based as expressed in U.S. Dept. of Energy Grant Report #DOE/R6/10969 we see various attempts to reduce aerodynamic drag. In FIG. 6 and others of the U.S. Pat. No. 4,582,013 we see the addition of a tail which is swung by the wind. This reduces drag downwind from the rotor. In the Grant Report there is described a "Circulator" to reduce induced drag. See page 16 of the report.

When the rotor is made to rotate, the top and bottom plates of the rotor also rotate and cause the air next to them to swirl, causing aerodynamic drag to be induced. The design of the "Circulator" imposes a mechanical barrier to prevent this circulation.

Also worth mentioning is the statement in U.S. Pat. No. 4,582,013 column 28, lines 33-35 "Wind tunnel tests show major improvements in aerodynamic performance due to the presence of shield 9, and due to aerodynamic seals." The structure of this shield is explained in col. 28, lines 28-32.

SUMMARY OF THE INVENTION

Aerodynamic drag is directly dependent on the density of the atmosphere. Regardless of any other factor contributing to the increase in aerodynamic drag on a magnus rotor, reducing air density reduces aerodynamic drag. This reduction in the present invention is accomplished by sealing off the upper and lower plates and the half of the cylinder being rotated against the wind current, by an aerodynamic seal. A vacuum is defined by these surfaces which is maintained during the operation of the rotor. Also, the interior volume of the rotor is originally built with a vacuum.

It is the principal object of this invention to reduce aerodynamic drag on a magnus rotor.

The attainment of the foregoing and related objects, advantages and features should be more readily apparent to those skilled in the art after the review of the following more detailed description of the invention, taken together with the drawing.

BRIEF DESCRIPTION OF THE DRAWING

FIG. 1 is a perspective view of the invention.

DETAILED DESCRIPTION OF THE INVENTION

Turning to FIG. 1 we see magnus rotor 1 mounted on shaft 2 and operable by motor 3. Shield and tale 4 is made to enclose half the circular surface and both endplates of rotor 1. Along the lower rim of each endplate of rotor 1 and the leading and rear edge is aerodynamic seal 5a,b.

In operation, as rotor 1 is made to spin, Aerodynamic seal 5 is made to maintain a vacuum next to the endplates and half the radial surface of magnus rotor 1. Seals 5a,b are also made to maintain the vacuum of the interior volume of rotor 1. In this way the rotor may be spun faster for the same power input by motor 3. Assuming rotor 1 is rotated at a peripheral velocity of 1000 ft./sec. the normal force on rotor 1 by seal 5 may approach 1 bar depending on the design of seals 5,5a,5b. The torque exerted by rotor 1 on shaft 2 (which may be substituted for a blade on a wind power turbine) is found by applying the Kutta-Joukowski formula.

From the above description it is apparent the embodiment achieves the principal object of the invention. The above embodiment is provided purely as an example. Many other variations, modifications and applications of this invention may be made. These are considered to be equivalent and within the spirit and scope of the invention.

I claim:

1. A wind energy conversion system comprising:
A magnus rotor comprising,
   a. a cylinder with endplates, said endplates traversed by a shaft about which said cylinder may be rotated,
   b. a motor operatively connected to said shaft,
   c. a shield extended over said endplates and substantially half a radial surface of said cylinder,
   d. an aerodynamic seal circuit enveloping a volume of a vacuum between said shield and said cylinder and extended over a surface of said shield so a vacuum is not lost, and
   e. aerodynamic seals about said shaft and located on said shield so a vacuum within an interior of said cylinder is not lost, so when said cylinder is made to rotate aerodynamic drag on said cylinder is reduced.

* * * * *